No. 893,151.                                    PATENTED JULY 14, 1908.
                            E. DUCRETET.
        DEVICE FOR TRANSMISSION TO A DISTANCE OF SOUNDS PRODUCED
                         BY TALKING MACHINES.
                        APPLICATION FILED MAR. 4, 1907.
                                                        2 SHEETS—SHEET 1.

Witnesses:                                              Inventor:
C. M. Boulter                                        Eugène Ducretet.
H. K. Bueler                                    By Wm E. Boulter
                                                             Attorney.

No. 893,151. PATENTED JULY 14, 1908.
E. DUCRETET.
DEVICE FOR TRANSMISSION TO A DISTANCE OF SOUNDS PRODUCED BY TALKING MACHINES.
APPLICATION FILED MAR. 4, 1907.

2 SHEETS—SHEET 2.

Witnesses:

Inventor:
Eugène Ducretet.
By Wm E Boulter
Attorney.

UNITED STATES PATENT OFFICE.

EUGÈNE DUCRETET, OF PARIS, FRANCE.

DEVICE FOR TRANSMISSION TO A DISTANCE OF SOUNDS PRODUCED BY TALKING-MACHINES.

No. 893,151.	Specification of Letters Patent.	Patented July 14, 1908.

Application filed March 4, 1907. Serial No. 360,429.

*To all whom it may concern:*

Be it known that I, EUGÈNE DUCRETET, a citizen of the French Republic, and resident of Paris, France, have invented a certain new and useful Device for the Transmission to a Distance of Sounds Produced by Talking-Machines, of which the following is a specification.

My invention relates to talking machines and especially to a device adapted to enable cylinder phonographs or disk gramophones, as well as their reproducing membrane, to be used for the purpose of transmitting to a distance the vibrations recorded on the cylinder or on the disk of the phonograph or the gramophone.

With these objects in view, my invention consists in the combination and arrangement of parts as hereafter described and especially pointed out in the appended claims.

Figure 1:
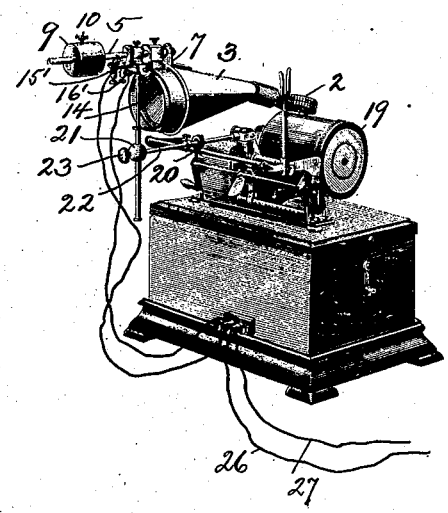
Figure 2:
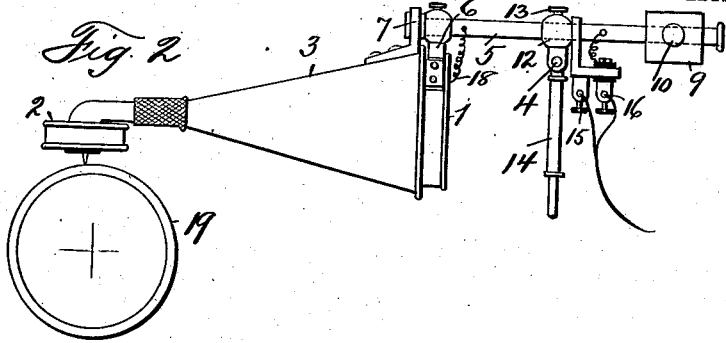
Figure 3:
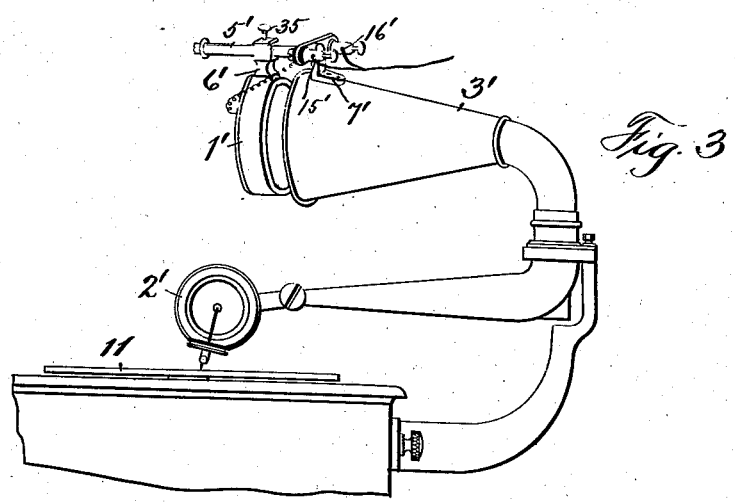
Figure 4:
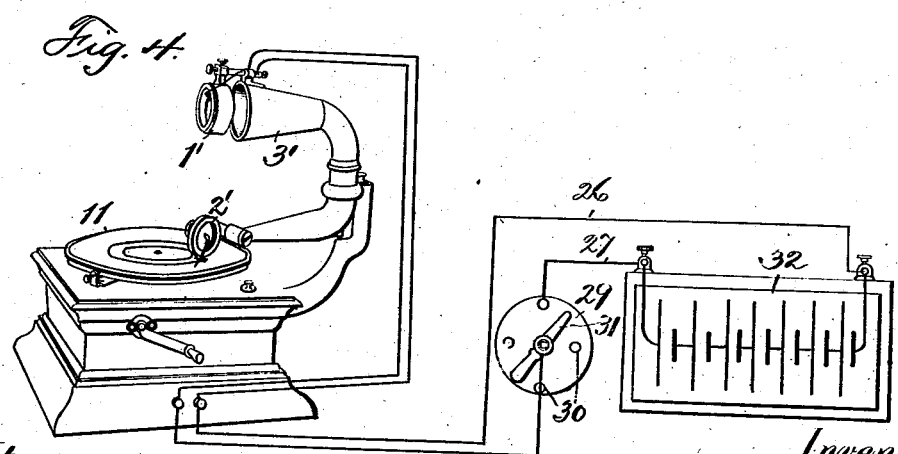

In the drawings:—Figure 1 is a perspective view showing my invention as used in connection with a cylinder phonograph. Fig. 2 is a side elevation on an enlarged scale, showing the invention in connection with the horn, sound-box, and cylinder of a phonograph. Fig. 3 is an elevation showing the invention in connection with the horn, sound-box, and disk of a gramophone. Fig. 4 is a perspective view showing the invention in connection with a gramophone, and showing the electric circuit.

My invention is applicable for use with either a cylinder phonograph or a disk gramophone, and in Figs. 1 and 2, I show the invention as applied to a cylinder phonograph. In these figures, 1 indicates a microphone which is adapted to be attached to the horn or trumpet 3 of the phonograph by any suitable means, as for instance, by means of a rod 5 carrying an arm 6 to which the microphone is attached or connected, said arm 5 being secured to a bracket 7 riveted to the trumpet 3. The opposite end of the rod 5 carries a weight 9 which is adjustable on the rod and is adapted to be secured in adjusted position by a set-screw 10.

2 indicates the sound-box, and 19 the cylinder of the phonograph. The microphone is to be arranged in a suitable position as regards inclination and distance with reference to the trumpet opening, and to effect this object, the rod 5 carries a sleeve 12 adjustable thereon and adapted to be held in adjustable position by a set-screw 13, and this sleeve has a pivotal connection at 4 with a supporting rod 14, which latter may have any suitable connection with the carriage 20 of the phonograph, as for instance, through the medium of a rod 22 carried by the carriage and which carries a ball 21 through which adjustably passes the rod 14. The electric current is conveyed to the microphone through the terminals 15 and 16, one of which may be connected with the metallic mass of the microphone as at 18. The weight 9, carried by the outer end of the rod 5, insures a suitable pressure of the needle of the sound-box on the cylinder 19 in Figs. 1 and 2, or the gramophone disk 11 in Figs. 3 and 4.

The microphone may be of any suitable construction, a suitable kind being shown in the U. S. Patent 712056, dated October 28, 1902, and the mount that supports, in the present instance, the microphone 1, is made entirely of metal and leaves freely exposed to the air the walls of the microphone.

In Figs. 3 and 4, I show my device as used in connection with a disk gramophone. In these figures, 11 indicates the disk, 2' the sound-box, and 3' the trumpet or horn. In these figures, my device is supported upon the trumpet or horn by means of a bracket 7' secured to the trumpet and which bracket carries a rod 5', upon which is adjustably mounted the microphone 1', said microphone being adapted to be secured in adjusted position by set-screw 35 carried by the arm 6', which directly supports the microphone. 15' and 16' are the terminals for the electric current. The electric current is conveyed to the microphone 1 in Figs. 1 and 2, through the terminals 15 and 16, and in Figs. 3 and 4 through the terminals 15' and 16'.

Any suitable arrangement may be provided for supplying the electric current to the terminals, as for instance, by means of a battery 32 seen in Fig. 4, the wires 26 and 27 from which, lead to the terminals on the microphone support. A suitable switch 29 with contact studs 30 and a current breaker 31, complete the electric devices necessary for working my invention.

As will be readily seen from the foregoing description I have provided a device allowing of one or more telephone receivers employed in loud sounding telephone stations being actuated at a distance.

What I claim is:—

1. The combination with a reproducer trumpet of a talking machine, of a supporting rod secured to the said trumpet substantially parallel to the axis of the latter, a microphone, and means for connecting the microphone to the supporting rod and to hold it in front of the trumpet-opening, in adjustable relation thereto and means for supplying electric current to the said microphone.

2. The combination with a reproducer trumpet of a talking machine, of a supporting rod secured to the said trumpet substantially parallel to the axis of the latter, a microphone, and means for connecting the microphone to the supporting rod and to hold it in front of the trumpet-opening, in adjustable relations thereto, means for supplying electric current to the said microphone and a weight adjustably mounted on the supporting rod.

3. The combination with a reproducer trumpet of a talking machine, of a supporting rod secured to the said trumpet substantially parallel to the axis of the latter, a microphone, means for connecting the latter to the supporting rod and to hold it in front of the trumpet-opening in adjustable relation thereto, a carriage of the talking machine, means connecting the said supporting rod with said carriage, and means for supplying electric current to the said microphone.

4. The combination with a reproducer trumpet of a talking machine, of a supporting rod secured to the said trumpet substantially parallel to the axis of the latter, a microphone, means for connecting the latter to the supporting rod and to hold it in front of the trumpet-opening in adjustable relation thereto, a carriage of the talking machine, a swivel connection between said supporting rod and said carriage, and means for supplying electric current to the microphone.

In testimony whereof I have hereunto set my hand in presence of two witnesses.

EUGÈNE DUCRETET.

Witnesses:
   HERNANDO DE SOTO,
   JACK H. BAKER.